(12) United States Patent
Pearson et al.

(10) Patent No.: US 7,613,778 B2
(45) Date of Patent: Nov. 3, 2009

(54) PROGRESSIVE DE-FEATURING OF ELECTRONIC MESSAGES

(75) Inventors: Malcolm Erik Pearson, Kirkland, WA (US); Robert George Atkinson, Wodinville, WA (US); David Richard Reed, Seattle, WA (US); Steven Douglas White, Bellevue, WA (US); Alexander Robert Norton Wetmore, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 10/822,347

(22) Filed: Apr. 12, 2004

(65) Prior Publication Data

US 2005/0256930 A1 Nov. 17, 2005

(51) Int. Cl.
*G06F 15/16* (2006.01)
(52) U.S. Cl. ............... 709/206; 709/205; 709/207; 713/153
(58) Field of Classification Search ......... 709/205–207; 713/200
See application file for complete search history.

(56) References Cited

U.S. PATENT DOCUMENTS

| | | | | |
|---|---|---|---|---|
| 5,530,848 | A * | 6/1996 | Gilbert et al. | 719/313 |
| 6,425,017 | B1 | 7/2002 | Dievendorff et al. | 719/315 |
| 2002/0152399 | A1* | 10/2002 | Smith | 713/200 |
| 2005/0138353 | A1* | 6/2005 | Spies et al. | 713/153 |
| 2006/0015736 | A1* | 1/2006 | Callas et al. | 713/176 |
| 2006/0036865 | A1* | 2/2006 | Brown et al. | 713/181 |
| 2006/0265689 | A1* | 11/2006 | Kuznetsov et al. | 717/117 |

OTHER PUBLICATIONS

Xiaojiang Du, et al., "Using Neural Networks to Identify Control and Management Plane Poison Messages," Integrated Network Management VIII. Managing It All. IFIP/IEEE 8th Inter. Symposium on Integrated Network Management, 2003, pp. 621-634.

Xiaojiang Du, et al., "Preventing Network Instability Caused by Propagation of Control Plane Poison Messages," 2002 Milcom Proceedings, vol. 1, Oct. 2002, pp. 93-98.

Lawrence D., "Transparent Critical Error Handling," Computer Language, vol. 6, No. 4, Apr. 1989, pp. 55-56, 58, 60, 62, 64-65, 67, 69.

Hong Va Leong, et al., "Using Message Semantics to Reduce Rollback in Optimistic Message Logging Recovery Schemes," 14th International Conference on Distributed Computing Systems, Jun. 1994, pp. 227-234.

* cited by examiner

*Primary Examiner*—John Follansbee
*Assistant Examiner*—Glenford Madamba
(74) *Attorney, Agent, or Firm*—Workman Nydegger

(57) ABSTRACT

Provided is a messaging system capable of detecting and processing at least a portion of a malformed message, e.g., a message that previously failed to process. An identifier and state information for the message can be logged. Based on the stored information, a determination can be made that the message previously failed to process. The message can then progressively be de-featured until the message can be processed or until the message is determined to be poisonous, whereupon it can be deleted or otherwise removed from the message stream permanently or temporarily—including moving the message to storage for operator inspection or for delayed delivery.

18 Claims, 4 Drawing Sheets

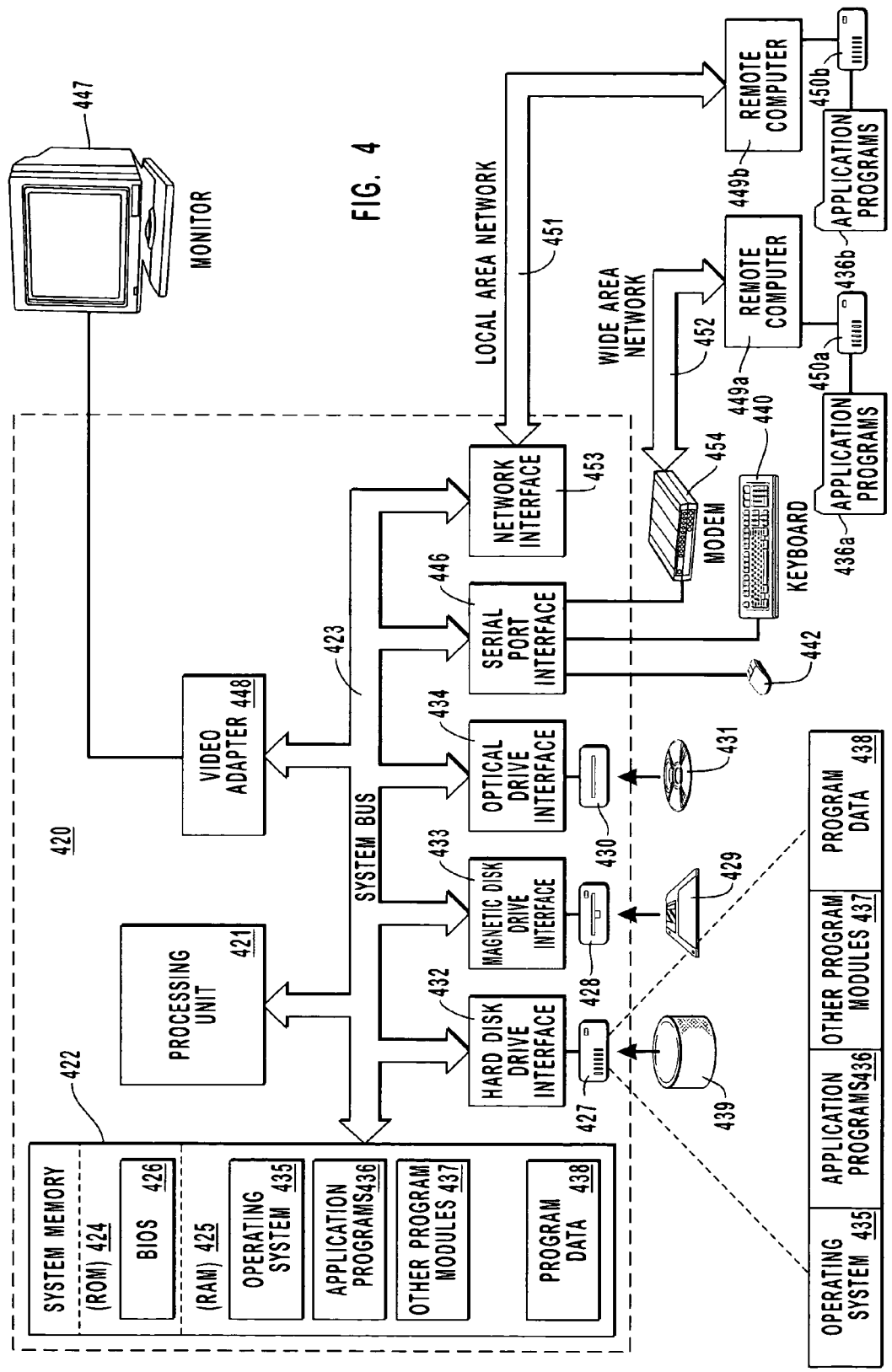

PROGRESSIVE DE-FEATURING OF ELECTRONIC MESSAGES

CROSS-REFERENCE TO RELATED APPLICATIONS

N/A

BACKGROUND OF THE INVENTION

1. The Field of the Invention

The present invention generally relates to messaging systems. In particular, the present invention provides for de-featuring portions of electronic messages that may be causing a message processor to fail.

2. Background and Related Art

Messaging systems have become an increasingly popular way to communicate. These communication systems range from e-mail systems to secured transactions, from chat rooms to various web services such as Internet shopping. Each of these communication systems requires that end points in a connection use a special set of rules when they communicate, called protocols. Protocols exist at several functional layers within the end-to-end communication and are often described in an industry or international standard.

A few examples of such protocols include: Transmission Control Protocol (TCP), which uses a set of rules to exchange messages with other Internet points at the information packet level; and Internet Protocol (IP), which uses a set of rules to send and receive messages at the Internet address level. Additional protocols that are usually packaged with a TCP/IP suite include Hypertext Transfer Protocol (HTTP), File Transfer Protocol (FTP), Simple Mail Transfer Protocol (SMTP), Simple Object Access Protocol (SOAP), etc., each defining sets of rules to use with the corresponding programs elsewhere on the Internet or over a network connection.

Regardless of the protocol used to transfer a message between two end points, messages may include a wide variety of data files or message payloads for processing and consumption. For example, a message could include audio, video, images, application programs, and other kinds of data, as well as simple ASCII text, or other payloads encapsulated into a single message using a messaging format such as, e.g., Multi-Purpose Internet Mail Extensions (MIME). At each layer within the transfer of a message between end points, messages may be processed in accordance with the protocol used at that level to perform various functions on various machines. For instance, a server may process a message when scanning for anti-virus, anti-SPAM filtering, index searching, etc. The client, on the other hand, may process a message using the appropriate application for viewing or otherwise consuming the various forms of data files or content within the message.

At every level of processing, there exits a potential for a failure or process abort for any number of various reasons. For example, the message may have become malformed in transit or at the time of creation due to some loss or corruption of data within the message itself. Other more malicious reasons for message processing failure may occur through some form of system attack, e.g., where an individual launches poisonous messages (i.e., messages that have purposefully been corrupted and cannot or should not be processed) in an attempt to manipulate system resources or shutdown the system entirely. Another reason for processing failure may be due to errors within the software processing system itself. For instance, a program or application attempting to process a well-formed message, or a portion thereof, may be malfunctioning causing the message processor to crash. As such, the message may appear to be malformed or poisonous, but it's actually a software malfunction.

Regardless of the reason for the processing failure, other portions of the message may still be valid and/or capable of being processed. Due in part, however, to the fact that the processing system itself crashes, there is currently no way to identify and remove those portions of the message that are problematic. Accordingly, there exists a need to identify, process, and preserve valid content included within an electronic message by removing problematic portions of a message that have previously caused a processing failure.

BRIEF SUMMARY OF THE INVENTION

In accordance with exemplary embodiments of the present invention, the above-identified deficiencies and drawbacks of current messaging systems are overcome. For example, exemplary embodiments provide a computer system with a message processor capable of processing at least a portion of a message where an attempt to previously process the message failed.

Message processing state information may be accessed to identify the message that previously failed to process. A portion of the message may then be removed to increase the likelihood of the message processor being able to appropriately process the message. After removing the portion of the message, an attempt to reprocess the message may be made.

Other example embodiments regarding the de-featuring process described above may be progressively repeated when the message fails to reprocess. In such instance, the message processing state information may be updated with information that indicates the message failed to reprocess. Thereafter, the message processing state information may be accessed for identifying the message as failing to reprocess. Additional portion(s) of the message may then be removed to increase the likelihood of the message processor being able to appropriately process the message. Subsequent to the removal of the additional portion(s) of the message, another attempt to reprocess the message is made.

Still other example embodiments provide that the aforementioned progressive de-featuring process may be based on rules associated with the type of content within the portion of the message removed. For example, the removal may be based on one or more of an alternative format of the message, video data, audio data, image data, text, or header information. Similarly, the de-featuring rules may be defined by a messaging encapsulation format used. For instance, in MIME format the removal of the portion of the message may be based on the type of content defined within the message, e.g., mixed multi-part data, alternative multi-part data, parallel multi-part data, digest multi-part data, application data, video data, audio data, image data, text, header information, etc.

Of course, the content removed is not limited to just data files. For example, other example embodiments provide that the above rules are defined by a protocol for processing or transferring the message, e.g., STMP, HTTP, TCP, UDP, SOAP, etc. Accordingly, the content removed could also extend to things like executable instructions in the case of XML, HTML, and other program languages (e.g., compiled source code). Moreover, the content removed might include processing instructions. In other instances, the content removed could be meta data, e.g., message headers or portions of the message headers. Regardless of the type of content removed, however, other example embodiments provide that portions of the message may be progressively removed in a hierarchical or random fashion.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 4 illustrates an example system that provides a suitable operating environment for the present invention.

DETAILED DESCRIPTION OF THE PREFERRED EMBODIMENTS

The present invention extends to methods, systems and computer program products for progressive de-featuring electronic messages. The embodiments of the present invention may comprise a special purpose or general-purpose computer including various computer hardware, as discussed in greater detail below.

The present invention provides for progressively de-featuring electronic messages, e.g., malformed messages that have previously failed to process and/or cause a process abort. Example embodiments provide for a log with message processing state information for identifying messages that previously failed to process. A portion of the message may be removed to increase the likelihood of processing the remaining sections of the message. This de-featuring process can be progressively implemented based on various rules as described hereinafter.

Reference will now be made to the figures wherein like structures will be provided with like or similar reference designations. It is understood that the drawings are examples schematic representations of embodiments of the invention, and are not meant to limit or otherwise narrow the scope of the present invention.

Figure 1:
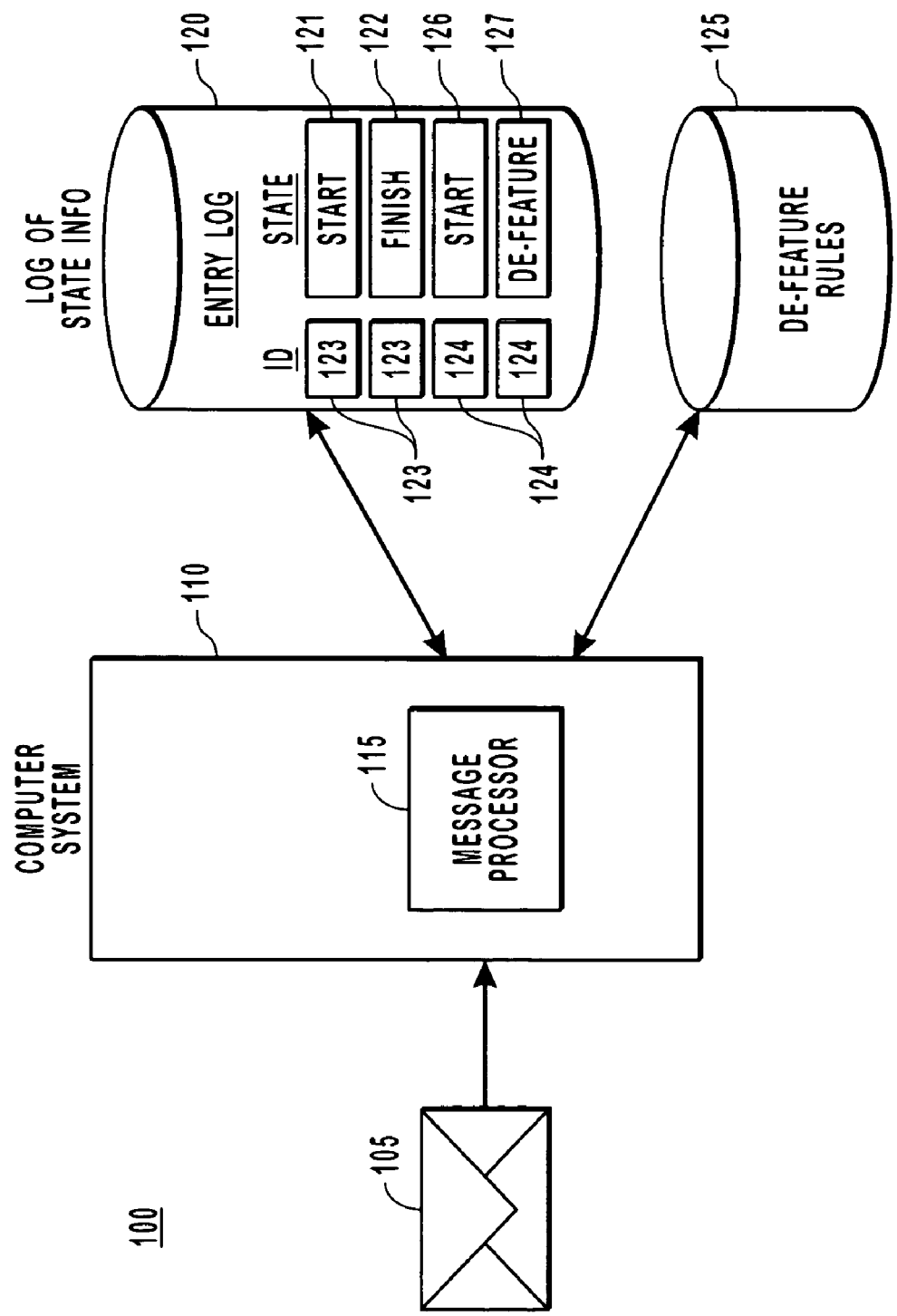
FIG. 1 illustrates a messaging system with de-featuring capabilities in accordance with example embodiments of the present invention.

FIG. 1 illustrates a messaging system 100 capable of identifying malformed messages, or processing errors that give the appearance of a malformed message, and progressively de-featuring such messages until at least a portion of the message can be processed or it is determined that the message (e.g., is poisonous and) should be discarded. As shown, message 105 is received by computer system 110 that includes a message processor 115. Computer system 110 could be, e.g., a message server, intermediary server, client or any other similar principle capable of processing a message. Once computer system 110 receives message 105 an attempt to process the message is made by message processor 115.

Example embodiments provide for a log of state information 120, which keeps fingerprints, e.g., identifies and keeps state, for messages as they are being processed. For example, when message processor 115 attempts to process message 105 an identifier (ID) 123, 124 for message 105 may be created and stored in log of state information 120 along with the start state 121, 126. The log 120 may be any well known type of storage system. Further, the ID 123, 124 could be, e.g., a simple hash or any other well-known way to uniquely identify the message 105.

If message 105 is successfully processed, an indication may be made to the log of state info 120, as shown by ID 123 and finish state 122. If, on the other hand, processing fails or is otherwise aborted, example embodiments provide a mechanism for identifying a message as failing to process. For example, either in response to some event, such as system restart after a failure (e.g., system reboot, process restart, thread restart, etc.), or just periodically, the system may scan the log 120 to identify messages that have a start state, but no corresponding finish state, e.g., message ID 124 with a start state 126 and no finish state. In such instance, message 105, e.g., is identified as being malformed—either actually or in appearance as described above—or poisonous.

Once message 105 has been identified as failing to process, other example embodiments provide for mechanisms capable of identifying the message 105 as poisonous, as opposed to a malformed message that may contain valid content. For example, stored IP addresses or rules (e.g., messages without source information) that identify a source or message as a malicious attack or SPAM may be stored. In such cases, these messages may be assumed to be poisonous and automatically deleted or moved to a junk folder.

Still other example embodiments provide that if a malformed message 105 cannot be immediately identified as poisonous (or while the message is poisonous, there is still value to try to find portions of the message that are not poisonous and can still be delivered), it may be progressively de-featured in an attempt to salvage valid content within the message. For example, if message 105 has ID 124 in log 120, which has a start state 126 with no finish state, it can be identified as malformed. With no indication that message 105 is poisonous, a portion of the message 105 may be removed to increase the likelihood of message processor 115 being able to appropriately process the remaining portion of the message 105.

The portion or content removed from message 105 may be, e.g., based on various de-featuring rules 125 stored or expressed in the core system application 110. For example, the portion removed may be based on the type of content within the message, e.g., an alternative format of the message, video data, audio data, image data, text, header information, etc. Further, the content removed may be based upon a particular protocol for transporting the message, e.g., STMP, HTTP, TCP, UDP, SOAP, etc. Alternatively, or in conjunction, the content may be removed on the basis of the formatting of the message, e.g., for encapsulation. For instance, if MIME protocol were used, the content removed may be chosen from any of a mixed multi-part data, alternative multi-part data, parallel multi-part data, digest multi-part data, application data, video data, audio data, image data, text, header information, or even the entire message itself. Of course, the content removed is not limited to just data files. For example, the content removed could be meta data, for example message headers or portions of the message headers. Further, the content removed could extend to things like executable instructions in the case of XML, HTML, and other program languages (e.g., compiled source code).

Further, example embodiments provide a way to process portions of a message that includes appropriately formed content or messages that are unable to be processed, e.g., when instructions that process the content malfunction. For instance, a message may include an appropriately formatted attachment, such as an image file, of a specific format (e.g., JPEG). The software application, however, that attempts to process the attachment malfunctions and the attachment and the message are not processed. Accordingly, the attachment can be removed so that the malfunction instructions are not called. Alternatively, example embodiments provide that the process can be suspended or the instructions for processing the attachment may be removed to determine if the process is causing the message processing to fail.

After removal of the portion of the message, message processor 115 reprocesses message 105 in an attempt to open and perform desired functions on the message 105. As illustrated below regarding FIG. 2, this de-featuring process can be progressively repeated until message 105 is either determined to be deliverable or until message 105 has been determined to be completely poisonous, whereupon message 105 can be deleted or otherwise removed from the message stream permanently or temporarily—including moving the message to storage for operator inspection or for delayed delivery. In the case where the message is considered undeliverable, however, other example embodiments provided that an indication of such may be returned to the intended recipient, the sender, processes, or all of the above.

Example embodiments also provide that the progressive de-featuring and rules (e.g., type of content) may be applied in a hierarchical fashion—or any other scheme to select from a set of de-featuring strategies. For instance, example embodiments provide that each de-featuring state 127 (i.e., the content removed) can be recorded in log state info 120 (or other similar store) under the appropriate message ID 124 as a way of identifying those portions of the message that have been removed. This information may be used such that each progressive de-featuring of the message may be based on the previous content removal. Alternatively, the determination of the portion of the message to be removed may be random, and not based on any heuristic state information 127 in the log 120.

Similar to the embodiment that provides for the hierarchal progressive de-featuring based on rules, the content removed may be a single piece or type of content or may be multiple portions. These ideas can be further illustrated in the de-featuring process shown in FIG. 2.

Figure 2:
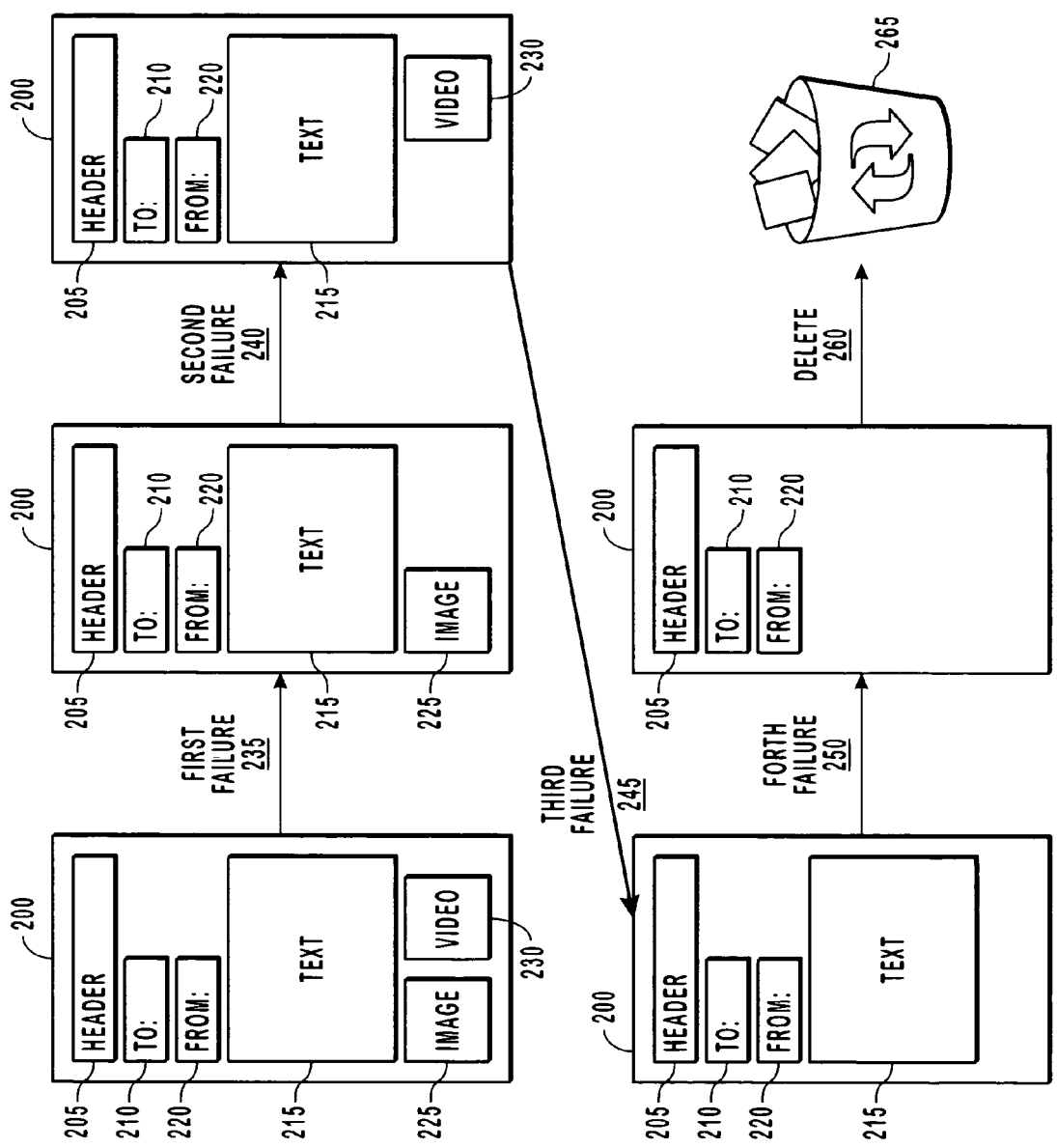
FIG. 2 illustrates an example of the de-featuring a message in accordance with exemplary embodiments of the present invention.

FIG. 2 illustrates example embodiments for progressively de-featuring a message 200 when various attempts to process it fail. As shown, message 200 includes the following fields: a header 205, a "to" field 210, a "from" field 220, text 215, an image 225 and video data 230. In a first attempt to process the message 200, a first failure 235 occurs. This first failure 235 may then be detected in accordance with previously described example embodiments previously described. Further, a portion of above.

For example, the de-featuring rules may indicate that video data 230 should first be removed prior to a subsequent attempt to reprocess. Accordingly, as shown, the video data 230 is removed and a second attempt to reprocess message 200 is made. Upon a second failure 240 to process message 200, the rules may indicate that the image data 225 content should be removed prior to a third attempt to process the message. Upon a third failure 245 to process message 200, the rules may define that both the video 230 and image 225 data should be removed prior to a fourth attempt to process the message. Upon a fourth failure 250, the rules may indicate that the video data 230, image data 225 and the "text" field 215 be removed subsequent to another attempt to reprocess message 200. This process may be repeated in accordance with the de-featuring rules until the message is adequately processed and determined to be deliverable. Of course, at some point the value of the content with the message will no longer be useful, at which point the message 200 may be considered poisonous and deleted 260 by putting it in recycle bin 265.

The above illustrates just one example for progressively de-featuring a message in accordance with a set of de-featuring rules. As one would recognize, however, there are many rules and numerous orderings for de-featuring a message. As such, the above de-featuring of message 200 is used for illustrative purposes only, and is not meant to limit or otherwise narrow the scope of the present invention.

The following pseudo-code represents an example of an algorithm that can be executed to implement the above de-featuring process. The pseudo-code algorithm can be implemented in computer-executable instructions of any of a variety of programming languages.

Line 1:  Upon event or periodically, check log to determine if entry exits with a processing start and no corresponding end.
Line 2:     if entry exists then
Line 3:        if there is another de-featuring state to try then
Line 4:           update log indicating attempt at next level of de-featuring then
Line 5:        de-feature message in accordance with next level then
Line 6:        attempt to process de-featured message then
Line 7:           if process completes write log entry that message process "finish" or remove all log entries related to processing of this message
Line 8:           else if return to Line 1.
Line 9:        else if all possible de-featuring states have been exhausted then
Line 10:          remove the message from the message flow then
Line 11:          stop processing message
Line 12:    else if there is no log entry this is the first attempt to process message then
Line 13:       write log entry for message processing "start" then
Line 14:       attempt to process the message then
Line 15:          if process completes write log entry that message process "finish" or remove all log entries related to processing of this message
Line 16:          else if return to Line 1.

Example embodiments of the present invention can include computer-executable instructions for implementing the algorithm represented in the pseudo-code example. For instance, computer system 110, which could be any of a number of systems, such as a server, client, router, etc., may include computer-executable instructions for implementing Lines 1-16 or the above example pseudo-code.

The present invention may also be described in terms of methods comprising functional steps and/or nonfunctional acts. The following is a description of steps and acts that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of acts/or steps.

Figure 3:
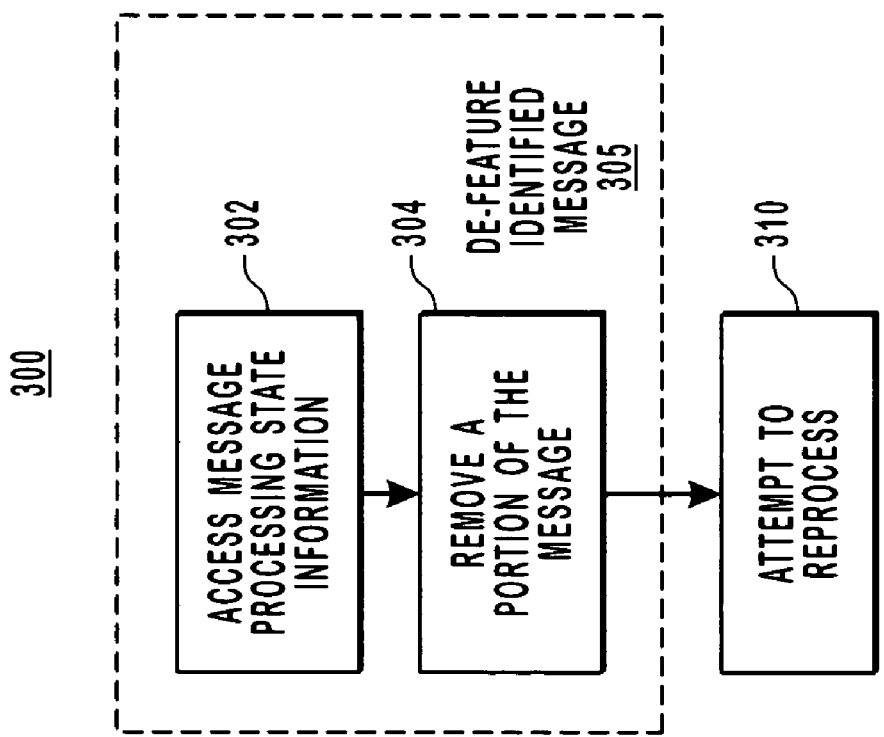
FIG. 3 illustrates an example flow chart of a method for processing at least a portion of a message where an attempt to previously process the message failed.

FIG. 3 illustrates an example flow chart of a method 300 that includes steps for and acts of processing at least a portion of a message wherein an attempt to previously process the message failed. The following description of FIG. 3 will occasionally refer to corresponding elements from FIG. 1. Although reference may be made to specific elements in FIG. 1, such elements are used for illustrative purposes only and are not meant to limit or otherwise narrow the scope of the present invention.

Method 300 may include a step for de-featuring 305 an identified message that previously failed processing. The message 105 may be any one of an e-mail message, SOAP message, message board post, web message or instant message. Further, the step for 305 may include any corresponding acts for de-featuring 305 an identified message 105. In the example method 300 of FIG. 3, however, the step for 305 includes corresponding acts of accessing 302 message processing state information and removing 304 a portion of the message to increase the likelihood of a message processor 115 being able to appropriately process the message 105. The message processing state information may include a message ID (e.g., 123,124) and state information (e.g., 121, 122, 126, 127) indicating various states for message 105. Further, the processing state information may be stored in a log 120 and identified (e.g., ID 123,124) through a hash of the message.

Example embodiments provide that the portion of the message 105 that is removed may be based on de-featuring rules 125 associated with the type of content within the portion of the message removed. For example, the de-featuring may be based upon the type of content of one or more of an alternative format of the message, video data, audio data, image data, text, header information, etc. Other embodiments provide that the rules are defined protocols for the message 105, such as, STMP, HTTP, TCP, UDP, etc. Other embodiments provided that the de-featuring rules are defined by the formatting of the message. For example, if the encapsulation format is MIME, the rules may define in a hierarchical fashion the type of content to be removed at the levels of mixed multi-part data, alternative multi-part data, parallel multi-part data, digest multi-part data, application data, video data, audio data, image data, text, header information or even the message itself.

Method 300 also includes an act of attempting 310 to reprocess the message 105 subsequent to removing the portion of the message 105. Method 300 may be progressively reiterated until the message 105 is appropriately processed or until a predefined point to where it is determined the message 105 is poisonous and should be deleted. The message processing state information 120 may further indicate those portions of the message that were previously de-featured and record this de-featured state information (e.g., 127) along with the identity (e.g., ID 124) of the message 105 for future reference when applying the de-featuring rules.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise computer storage media or communication media. Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a communication medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disk drive 430 for reading from or writing to removable optical disk 431 such as a CD-ROM or other optical media. The magnetic hard disk drive 427, magnetic disk drive 428, and optical disk drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disk 431, other types of computer readable media for storing data can be used, including magnetic cassettes, flash memory cards, digital versatile disks, Bernoulli cartridges, RAMs, ROMs, and the like.

Program code means comprising one or more program modules may be stored on the hard disk 439, magnetic disk 429, optical disk 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a microphone, joy stick, game pad, satellite dish, scanner, or the like. These and other input devices are often connected to the processing unit 421 through a serial port interface 446 coupled to system bus 423. Alternatively, the input devices may be connected by other interfaces, such as a parallel port, a game port or a universal serial bus (USB). A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When a wireless link, or other means for establishing communications over the wide area is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. In a computer system with a message processor, a method of reprocessing a message from which a portion has been removed after an attempt to previously process the message failed, the method comprising the acts of:

receiving a first message at the computer system that is intended for a particular recipient, wherein the computer system is configured to process messages and log state information to identify each message and the state of the processing of each message in a log, such that upon attempting to process a message, the computer system logs a first indication along with an identifier of the message to indicate that the computer system is attempting to process the message, and upon successfully processing the message, the computer system logs a second indication along with the identifier of the message to indicate that the computer system successfully processed the message;

attempting to process the first message in order to deliver the first message to the recipient, wherein upon attempting to process the first message, the computer system logs the first indication corresponding to the first message;

subsequent to logging the first indication corresponding to the first message, the computer system failing to process the message such that the computer system does not log the second indication corresponding to the first message;

the computer system accessing the log and identifying, based on the absence of the second indication, that the message previously failed to process; and repeatedly attempting to reprocess the first message by first removing a portion of the first message and then attempting to reprocess the first message such that at each attempt to reprocess the first message, a different portion of the first message is removed prior to reprocessing the first message, such that the first message is repeatedly reprocessed until it is successfully processed or until a predefined point at which it is determined that the first message should be deleted rather than reprocessed.

2. The method of claim 1, further comprising the acts of:
the computer system receiving a new message;
the computer system generating an identifier for the new message;
the computer system checking the log to determine if a first indication exists for the new message;
upon a determination that no first indication exists for the new message, the computer system logging a first indication along with the identifier that the processing of the new message has started; and
the computer system attempting to process the new message and logging the second indication along with the identifier only in response to the new message processing completing successfully.

3. The method of claim 2, wherein the identifier is a hash of the new message.

4. The method of claim 2, wherein the new message is one of an e-mail message, SOAP message, messaging board post, web message, or instant message.

5. The method of claim 1, wherein at each attempt to reprocess the first message, the computer system logs a third indication along with the identifier that specifies which portion of the message was removed for the attempt to reprocess the first message such that upon each subsequent attempt to reprocess the first message, the computer system determines which portion was removed for the previous attempt and removes the previously removed portion in addition to another portion prior to the subsequent attempt to reprocess the first message.

6. The method of claim 1, wherein the computer system accesses rules which specify which portion of the first message should be removed at each attempt to reprocess the first message and wherein a first rule is based on the type of content within the portion of the message removed.

7. The method of claim 6, wherein the type of content within the portion of the message removed is one or more of an alternative format of the message, video data, audio data, image data, text, header information, or executable instructions.

8. The method of claim 6, wherein the rules are defined by the transport protocol for the message, which is one of STMP, HTTP, TCP, UDP, or SOAP.

9. The method of claim 6, wherein the rules are defined by content format MIME, and wherein the content of the portion of the message removed is one or more of a mixed multipart data, alternative multipart data, parallel multipart data, digest multipart data, application data, video data, audio data, image data, text, header information or the message itself.

10. A computer program product for use in a computer system with a message processor, the computer program product for implementing a method of reprocessing a message from which a portion has been removed after an attempt to previously process the message failed, the computer program product comprising one or more computer storage media having stored thereon computer-executable instructions that, when executed by a processor, cause the computer system to perform the following:
  receive a first message that is intended for a particular recipient, wherein the computer system is configured to process messages and log state information to identify each message and the state of the processing of each message in a log, such that upon attempting to process a message, the computer system logs a first indication along with an identifier of the message to indicate that the computer system is attempting to process the message, and upon successfully processing the message, the computer system logs a second indication along with the identifier of the message to indicate that the computer system successfully processed the message;
  attempt to process the first message in order to deliver the first message to the recipient, wherein upon attempting to process the first message, the computer system logs the first indication corresponding to the first message;
  subsequent to logging the first indication corresponding to the first message, fail to process the message such that the computer system does not log the second indication corresponding to the first message;
  access the log and identifying, based on the absence of the second indication, that the message previously failed to process; and
  repeatedly attempt to reprocess the first message by first removing a portion of the first message and then attempting to reprocess the first message such that at each attempt to reprocess the first message, a different portion of the first message is removed prior to reprocessing the first message, such that the first message is repeatedly reprocessed until it is successfully processed or until a predefined point at which it is determined that the first message should be deleted rather than reprocessed.

11. The computer program product of claim 10, further comprising computer-executable instructions that, when executed by a processor, cause the computer system to perform the following:
  receive a new message;
  generate an identifier for the new message;
  check the log to determine if a first indication exists for the new message;
  upon a determination that no first indication exists for the new message, log a first indication along with the identifier for the new message that the processing of the new message has started; and
  attempt to process the new message, and log the second indication along with the identifier only in response to the new message processing completing successfully.

12. The computer program product of claim 11, wherein the new message is one of an e-mail message, SOAP message, messaging board post, web message, or instant message.

13. The computer program product of claim 10, wherein at each attempt to reprocess the first message, the computer system logs a third indication along with the identifier that specifies which portion of the message was removed for the attempt to reprocess the first message such that upon each subsequent attempt to reprocess the first message, the computer system determines which portion was removed for the previous attempt and removes the previously removed portion in addition to another portion prior to the subsequent attempt to reprocess the first message.

14. The computer program product of claim 10, wherein the computer system accesses rules which specify which portion of the first message should be removed at each attempt to reprocess the first message and wherein a first rule is based on the type of content within the portion of the message removed.

15. The computer program product of claim 14, wherein the type of content within the portion of the message removed is one or more of an alternative format of the message, video data, audio data, image data, text, header information, or executable instructions.

16. The computer program product of claim 14, wherein the rules are defined by the transport protocol for the message, which is one of STMP, HTTP, TCP, UDP, or SOAP.

17. The method of claim 1, further comprising the act of periodically scanning the log in order to find messages that have not processed successfully.

18. The method of claim 1, further comprising the act of scanning the log in order to find messages that have not processed successfully in response to an event consisting one of (1) system reboot, (2) process restart, or (3) thread restart.

* * * * *